(12) United States Patent
Birtcher et al.

(10) Patent No.: US 8,162,296 B2
(45) Date of Patent: Apr. 24, 2012

(54) SPLASHGUARD FOR HIGH FLOW VACUUM BUBBLER VESSEL

(75) Inventors: Charles Michael Birtcher, Valley Center, CA (US); Thomas Andrew Steidl, Escondido, CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 463 days.

(21) Appl. No.: 12/407,279

(22) Filed: Mar. 19, 2009

(65) Prior Publication Data

US 2010/0237085 A1 Sep. 23, 2010

(51) Int. Cl.
*B01F 3/04* (2006.01)
(52) U.S. Cl. ............... 261/121.1; 261/122.1; 96/189; 96/192; 96/350
(58) Field of Classification Search ........... 261/122.1, 261/122.2, 124, 121.1; 96/189, 190, 192, 96/350, 356, 358
See application file for complete search history.

(56) References Cited

U.S. PATENT DOCUMENTS

| | | | | |
|---|---|---|---|---|
| 1,339,609 | A * | 5/1920 | Stinson | 261/121.1 |
| 2,405,494 | A * | 8/1946 | Dupuy | 96/340 |
| 2,742,886 | A * | 4/1956 | McPherson | 123/363 |
| 2,886,127 | A * | 5/1959 | Brock | 417/363 |
| 4,350,505 | A * | 9/1982 | Mallory et al. | 96/249 |
| 4,450,118 | A | 5/1984 | Tuin | |
| 4,591,464 | A | 5/1986 | Kaneno et al. | |
| 5,199,963 | A * | 4/1993 | Scarp | 96/331 |
| 5,589,110 | A | 12/1996 | Motoda et al. | |
| 5,776,255 | A | 7/1998 | Asaba et al. | |
| 6,520,218 | B1 | 2/2003 | Gregg et al. | |
| 7,077,388 | B2 | 7/2006 | Stamp | |
| 2002/0145210 | A1 | 10/2002 | Tompkins et al. | |
| 2003/0042630 | A1 | 3/2003 | Babcoke et al. | |
| 2004/0013577 | A1 | 1/2004 | Ganguli et al. | |
| 2008/0143002 | A1* | 6/2008 | Steidl et al. | 261/122.1 |

FOREIGN PATENT DOCUMENTS

| | | |
|---|---|---|
| EP | 0420596 B1 | 6/1996 |
| EP | 1329540 A2 | 7/2003 |

OTHER PUBLICATIONS

GO Element 2008 catalogue, Semiconductor/High Purity Products, Pyongtaek Korea 459-050, www.goelement.co.kr.
GO Element Splash Guard, Applied Materials container drawing TCI-0457500, Nov. 5, 2007.

* cited by examiner

*Primary Examiner* — Charles Bushey
(74) *Attorney, Agent, or Firm* — Rosaleen P. Morris-Oskanian

(57) ABSTRACT

The present invention is a container having a diptube inlet, at least one baffle disc positioned between the outlet of the diptube and the outlet of the container to provide a narrow annular space between the baffle disc and the sidewall of the container to prevent liquid droplets from entering the outlet to the container and the inner surface of the container sidewall and an annular, radially inward projecting deflector ledge on the sidewall, proximate the baffle disc. The present invention is also a process of delivering a chemical precursor from a container having the above structure. Liquid and vapor delivery are both contemplated.

6 Claims, 5 Drawing Sheets

SPLASHGUARD FOR HIGH FLOW VACUUM BUBBLER VESSEL

BACKGROUND OF THE INVENTION

The electronics fabrication industry uses chemical precursor containers that convert liquid chemicals into chemical vapor for delivery to electronics fabrication reactors, i.e. tools, for conducting chemical vapor deposition ("CVD"). CVD is a favored technique for forming layers, films and other depositions in the construction of electronic fabrications such as integrated circuits or computer chips. Liquids or solids are preferred as sources of supply because of the efficiency of transport and storage of a volume of chemical precursor, but the industry frequently prefers to actually deliver the chemical precursor at the site of the tool in the form of a vapor, i.e. CVD. Alternatively, some fabrications are conducted using direct liquid injection ("DLI"), although even then, the liquid is vaporized in the tool after delivery.

When using vapor delivery for CVD, the containers typically have an inert carrier gas passed through them or bubbled, i.e., bubbler, to carry entrained chemical precursor vapor in the inert carrier gas to the tool. Bubblers typically have a downtube inlet where the carrier gas is introduced into the container under the surface of the liquid chemical precursor wherein the carrier gas bubbles up through the liquid chemical precursor, entraining the chemical precursor as the carrier gas surfaces the liquid as a bubble and exits the container or bubbler by an outlet set above the liquid level of the chemical precursor.

It is undesirable to have the chemical precursor leave the container through the outlet in the liquid form, even as small droplets. A homogenous vapor is preferred as the dispensed product of such bubblers. This avoids corrosion, cleanup, uneven flow, and aerosol droplets that can accumulate in the outlet piping form particulates during manufactureing and and container disconnect.

The industry has attempted various forms of splashguards for bubblers to address this issue, such as in: US 2008/0143002; U.S. Pat. No. 6,520,218; EP 1 329 540; US 2004/0013577; EP 0 420 596; U.S. Pat. No. 5,589,110; U.S. Pat. No. 7,077,388; US 2003/0042630; U.S. Pat. No. 5,776,255; and U.S. Pat. No. 4,450,118. Each of these attempts to provide splashguard function has had less than desired performance, but the present invention as disclosed below successfully provides high levels of splashguard function, while still allowing high flows of chemical precursor or flows under high vacuum or high pressure differential conditions as will be described and illustrated below.

BRIEF SUMMARY OF THE INVENTION

The present invention is a container having a diptube inlet ending proximate a base of the container; at least one baffle disc positioned between the outlet of the diptube and an outlet of the container, configured to provide a narrow annular space between the baffle disc and an inner surface of a sidewall of the container; and an annular, radially inward projecting deflector ledge on the sidewall, proximate the baffle disc; the baffle disc and deflector ledge capable of minimizing liquid droplets from entering the outlet to the container.

The present invention is also a process of delivering a chemical precursor vapor from a container comprising; passing a carrier gas through a diptube of the container; entraining liquid chemical precursor from the container into the carrier gas; passing the entrained chemical precursor and carrier gas past an annular, radially inward projecting deflector ledge on the sidewall and at least one baffle disc in a narrow annular space between an outermost edge of the baffle disc and the inner surface of the container sidewall

DETAILED DESCRIPTION OF THE INVENTION

The present invention is a vapor generation bubbler container designed for service in high vacuum or high flowrate conditions. The design prevents splashing and transport of aerosol droplets into the outlet delivery line that would result in erratic chemical mass flow delivery.

Semiconductor manufacturers are turning to the use of high value chemicals that are increasingly difficult to transport for deposition onto a wafer in a vacuum chamber or tool. The bubbler container of the present invention allows liquid chemical to be delivered from the container as a vapor at high vacuum, without the splashing and the formation of aerosol droplets in the outlet of the container that result in erratic chemical mass delivery rate. The present invention has a lower surface design that enables a constant saturation of a carrier gas with chemical vapor down to very low levels of the residual chemical. Yet, the present invention prevents splashing and the formation of aerosol droplets into the outlet of the container, that would result in erratic chemical mass delivery rate, even when the chemical level in the container is high. Previously, containers used for high vacuum service or high flowrate service had to be used with only a partial charge of chemical (i.e.: 50% full). This required the semiconductor manufacturer to change the container more often (taking down the tool), and added to the cost of the chemical, because of the increased container processing fees. This invention enables use of the container from a full liquid chemical level down to a very low level and reduces semiconductor tool downtime. Also, since it is effective at limiting the chemical aerosol particles in the outlet, it can reduce particulate generation that might result from degradation of the aerosol droplets that deposit in the outlet and all of the delivery piping to the processing chamber or tool. In this description, its is preferred to have a container of cylindrical shape with the axis of the cylinder in the vertical plane. Thus, descriptions of axial and radial are with respect to that type of container shape and orientation.

The present invention uses an annular radially inward projecting deflector ledge on the inner surface of the sidewall of the container in conjunction with one or more baffle discs at the upper part of the container that requires the carrier gas entrained with chemical precursor to pass indirectly to the outlet of the container by flowing tortuously to the radially innermost edge of the deflector ledge and to the outside of the baffle discs in a narrow annular space between the inner diameter of the bubbler inner surface sidewall and the outermost diameter or circumferential or perimeter edge of the baffle discs. This will be illustrated with reference to a preferred embodiment of the present invention.

Figure 1:
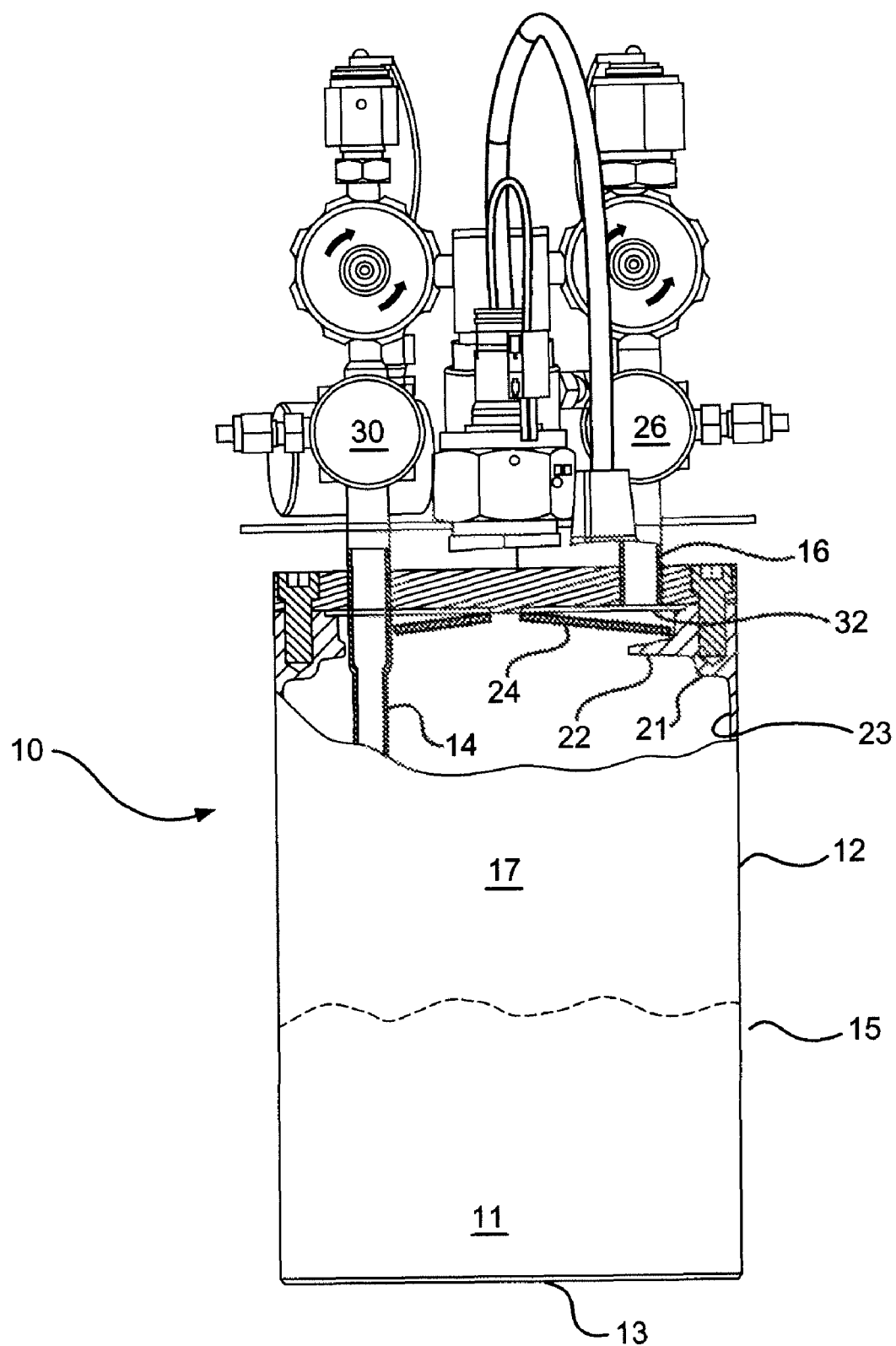
FIG. 1 is a schematic side view of an embodiment of the present invention in partial section.

FIG. 1 shows a bubbler container 10 of the present invention having a cylindrical bubbler sidewall 12 with a diptube inlet 14 terminating at its inlet end below the surface of the liquid chemical precursor, illustrated as approximately at line 15, but above the container base 13.

The splash guard comprises: (1) a baffle disc 24; and, (2) an annular, radially inward projecting deflecting ledge 22 on the inside surface 23 of the sidewall 12, wherein the baffle disc 24 has an outermost circumferential perimeter edge shape, preferably circular, and being concave downward, such as a shallow downwardly open cone; which baffle disc 24 and deflector ledge 22 act in cooperation to make a tortuous flow path for chemical precursor leaving the container 10. The baffle disc 24 is concave downward to further frustrate direct flow of chemical precursor to the outlet 16 and to collect condensed chemical precursor for return by coalesced droplets falling back into the stored chemical precursor (not illustrated). The baffle disc 24 has a diameter slightly less than the inside diameter of the cylindrical inner surface 23 of the sidewall 12 of the container 10. The space between the circumferential perimeter outermost edge of the baffle disc 24 and the inside surface 23 of the sidewall 12 of the container 10 is sufficient to allow gas to pass through the space with minimal pressure drop, but sufficiently narrow to minimize the passage of liquid that may be ejected from the liquid content of the bubbler under high flow rates of carrier gas through the diptube or significant pressure fluctuations. The container 10 has an upper portion 17 and a lower portion 11 and an exemplary liquid surface level 15, subject to change based upon the extent of fill and the duration of dispense, but typically below deflector ledge 22 and baffle disc 24 and above the ends of the inlet 14 and the level sensor.

Figure 2:
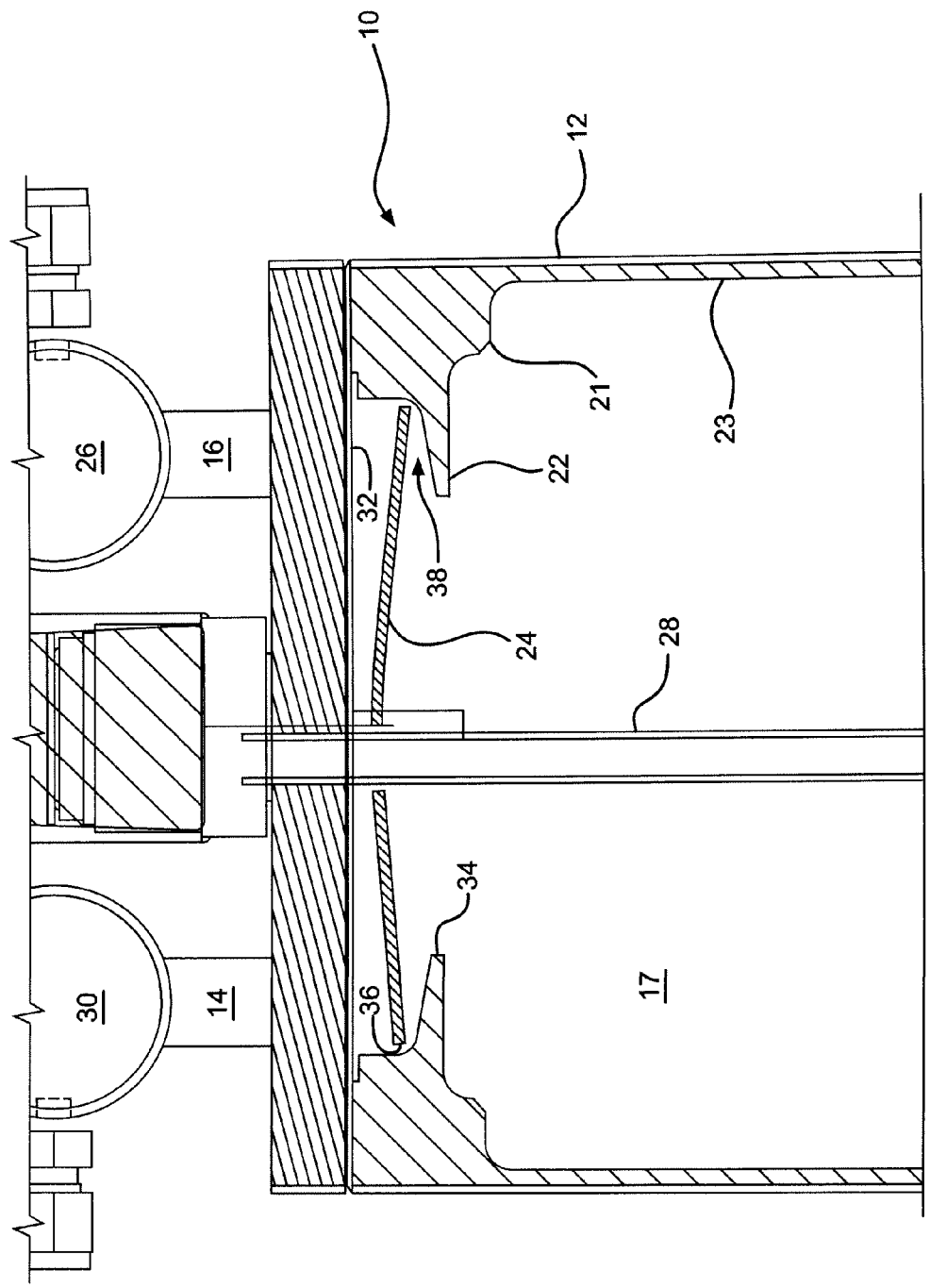
FIG. 2 is a partial schematic side view of an embodiment of the present invention in cross-section.

FIG. 2 shows an isolation of the internal structure of the container of the embodiment without the diptube 14 being illustrated. A level sense 28 is shown in the middle of the container to monitor liquid chemical levels. Although not shown, the level sensor ends near the base 13 of the container 10. Valve 30 controls the introduction of push or carrier gas through inlet 14 into the lower portion of the container, where it bubbles up through the liquid chemical, entraining a vapor of the chemical in the bubbles of the carrier gas. The bubbling action of the carrier gas as it exits the lower end of the inlet diptube 14 can create violent agitation of the liquid chemical. A high vacuum on the outlet 16 when valve 26 is opened can also cause violent or severe agitation of the liquid chemical. Either of these can lead to liquid chemical bubbling or splashing toward the outlet 16. The annular, radially inward projecting deflector ledge 22 associated with the sidewall 12 of the container or bubbler 10, acts to deflect any bubbling or splashing liquid chemical from nearing the outermost edge of the baffle disc 24 to protect the inlet end 32 of the outlet 16 from ingesting liquid chemical, rather than the designed chemical vapor entrained in carrier gas. The baffle disc 24 and the deflector ledge 22 form a tortuous flow path 38 for chemical precursor leaving the container 10.

In a preferred embodiment, the deflector ledge 22 is formed from a part of the sidewall 12 during the milling of the container or bubbler 10 from a solid piece of stainless steel stock. The deflector ledge 22 can have a conical shaped cross-sectional construction, ending in its innermost edge 34 radially inside the outermost edge 36 of the baffle disc 24. Deflector ledge can be an annular rim formed completely around the inner surface 23 of the sidewall 12. The combination of the baffle disc 24 and the deflector ledge 22 forms a tortuous flowpath 38 for the carrier gas and entrained chemical vapor, such path being extremely difficult for liquid phase chemical to follow.

Figure 3:
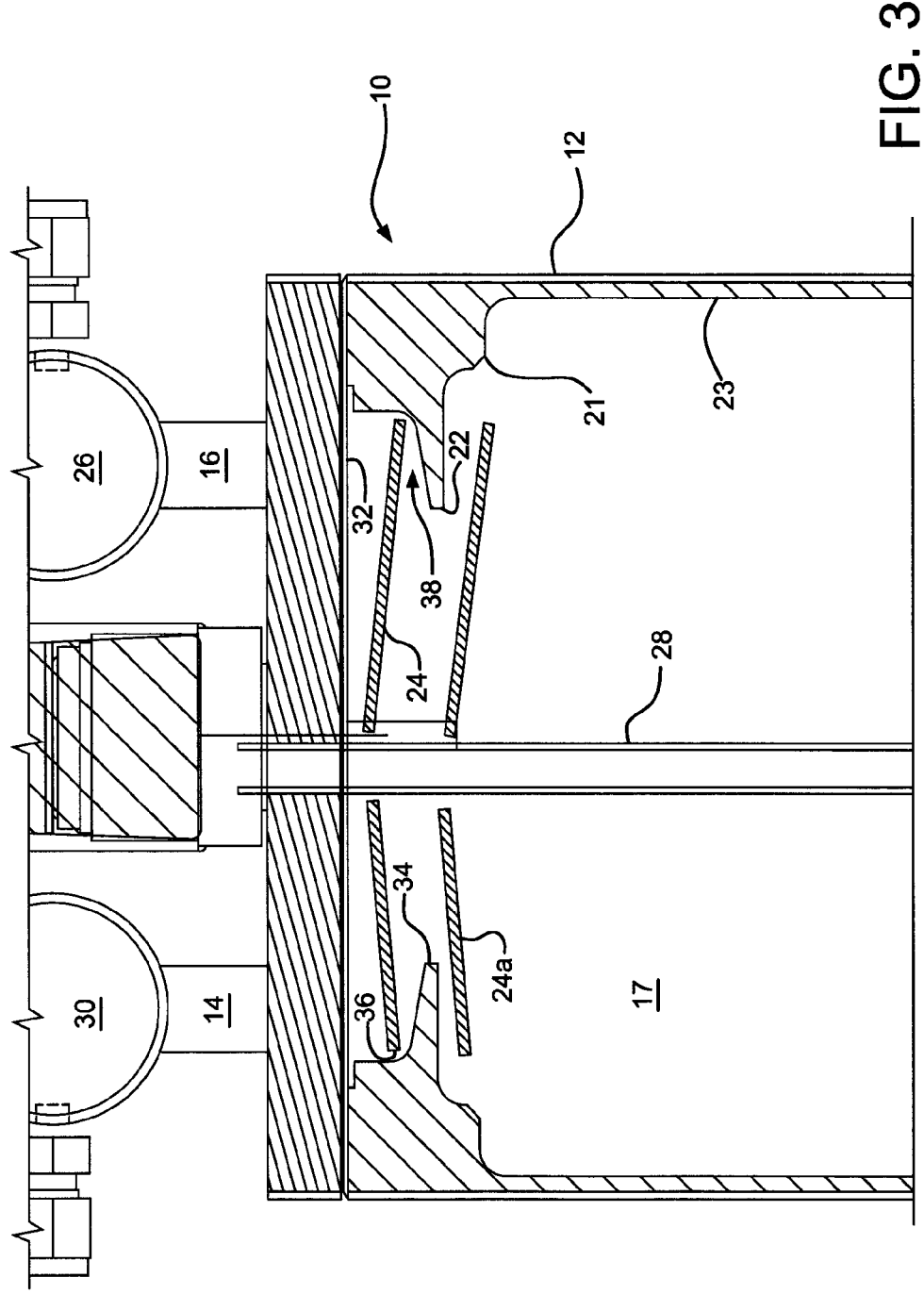
FIG. 3 is a partial schematic side view of a second embodiment of the present invention in cross-section.
Figure 4:
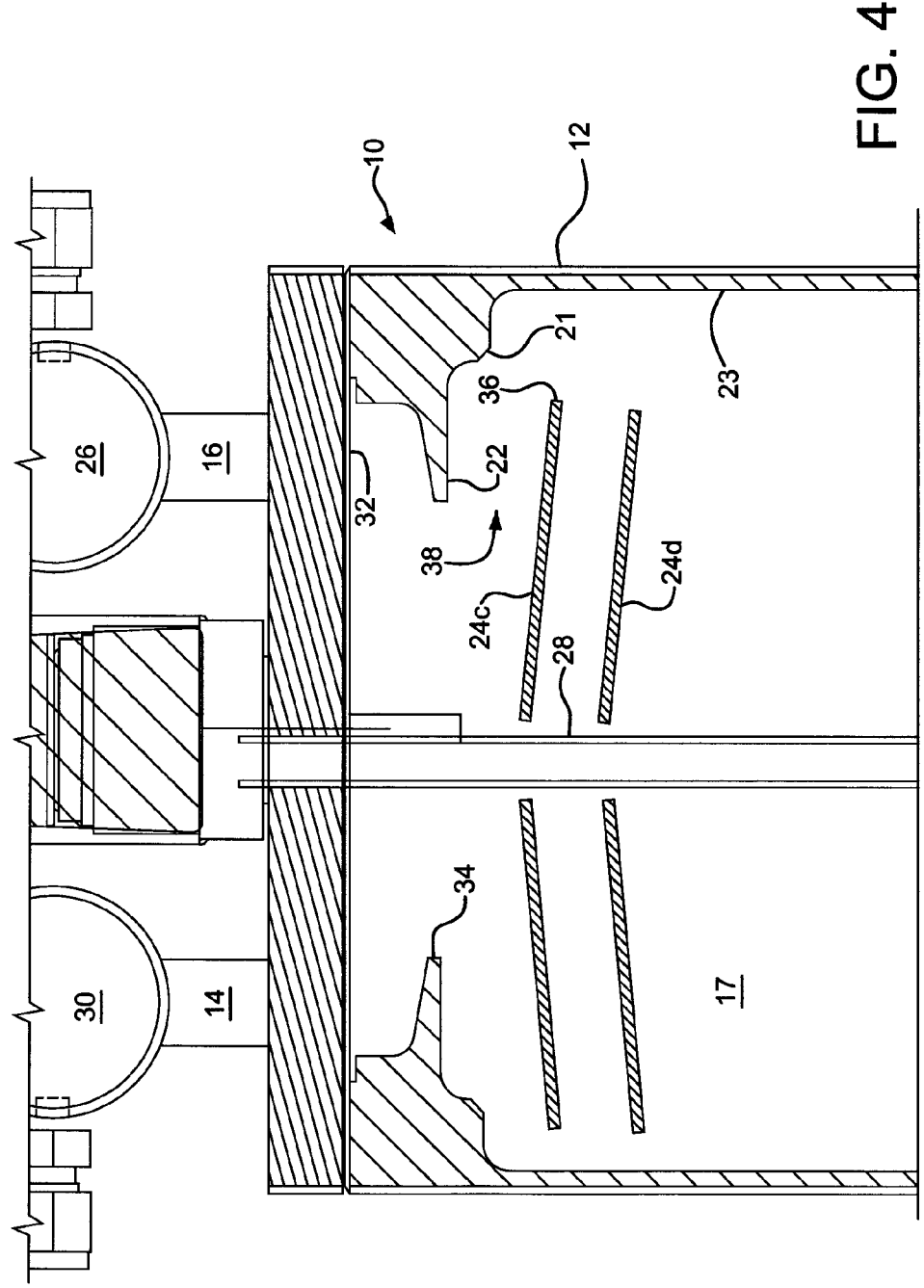
FIG. 4 is a partial schematic side view of a third embodiment of the present invention in cross-section.
Figure 5:
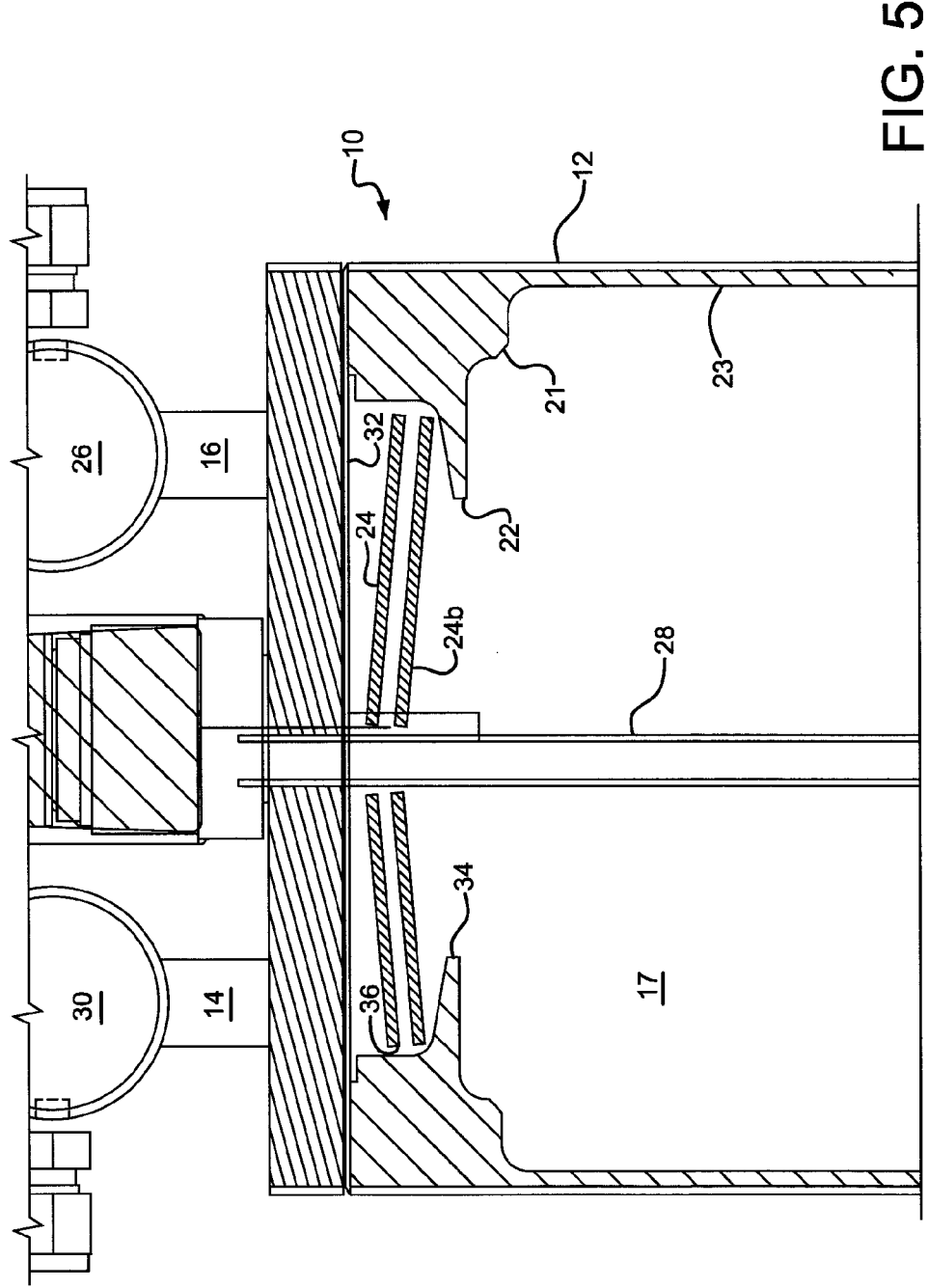
FIG. 5 is a partial schematic side view of a fourth embodiment of the present invention in cross-section.

Preferably, the baffle disc 24 is spaced axially above the deflector ledge 22 to provide an extremely narrow flowpath, sufficient for vapor, but difficult for liquid flow, that is, proximate one another. Alternately, the baffle disc 24 can be spaced axially below the deflector ledge 22. Further, alternately, the present invention envisions multiple baffle discs, such as a baffle disc 24 spaced axially above and a baffle disc 24a spaced axially below the deflector ledge, FIG 3; two baffle discs 24 and 24b spaced axially above the deflector ledge, FIG 5; two baffle discs 24c and 24d spaced axially below the deflector ledge, FIG 4; a deflector ledge spaced axially above and below each baffle disc; and a plurality of baffle discs and deflector ledges; all preferably proximate one another as defined above.

Experience has shown that bubbles can travel up the sidewall 12 of the container or bubbler 10 from the end of the inlet diptube 14, creating the greatest potential flow of liquid splashing adjacent the inside surface 23 of the sidewall 12 of the container 10. Thus, in one embodiment, the deflector ledge includes a shoulder 21 formed as an annular radially inward projecting edge spaced axially below the innermost edge 34 of the deflector ledge 22. The deflector ledge 22 and shoulder 21 are proportioned such that the deflector ledge 22 projects radially inward beyond the radially inward projection of the shoulder 21. This shoulder can be an integral part of the overall deflector ledge 22 and can be machined at the same time as the deflector ledge from a single stock of stainless steel or other metal. Shoulder 21 performs two functions. Shoulder 21 forms a sharp angle to the inner surface 23 and thus redirects liquid flowing up the inner surface into the interior of the container 10 and away from the tortuous pathway 38 formed by the respective edges of the baffle disc 24 and the deflector ledge 22. In addition, any liquid that collects on the deflector ledge 22 drains to the shoulder 21 and then falls back into the liquid chemical contained in the lower portion of the container or bubbler 10.

Baffle disc 24 and deflector ledge 22 are shown preferably at the upper region 17 of the container, but it is understood that other positioning are contemplated as long as they are above where the standard upper limit of the chemical filled in the container, or headspace or freeboard, as those skilled in the art would describe it, but at least above level 15.

Although the deflector ledge 22 and shoulder 21 are shown in this embodiment as being integral to one another and the sidewall, its is contemplated that both the deflector ledge 22 and the shoulder 21 could be separate pieces attached to the sidewall 12, such as by welding, friction fit or mechanical fastening, such as bolts, screws and similar fasteners. Even as separate pieces, deflector ledge 22 and shoulder 21 could be integral to one another or separate pieces from one another.

The deflector ledge 22, shoulder 21, and baffle disc 24 cooperate to form a tortuous flowpath 38 for chemical to be dispensed through the outlet 16. In some instances, under high vacuum or high flow rates, the liquid tends to foam above the liquid surface 15 into the headspace in the upper region 17 of the container 10. The tortuous flowpath 38 formed by the deflector ledge 22, shoulder 21 and baffle disc 24 substantially prevent such foam from reaching the outlet 16.

Although stainless steel has been mentioned with regard to certain embodiments, it is understood that the invention can be used on different metals, glass and plastic, including mild steel, Monel alloy, Hastelloy alloy, nickel alloys and similar materials of construction know to the persons of skill in the art.

The present invention provides superior minimization of liquid entrainment of droplets in the outlet and downstream piping of a container connected to a CVD tool of an electronics fabrication system. Using either a single baffle disc or multiples of the baffle disc, in combination with a deflector ledge provides the desired minimization of liquid droplet entrainment in the outlet 16 of the bubbler.

Although the baffle discs have been shown as circular discs with a concavity where the disc is slightly smaller than the inside diameter of the cylindrical vessel or bubbler sidewall, it is understood that any baffle of any shape which provides only a narrow annular space at the inner sidewall of the container is within the scope of the present invention. Likewise, any form of deflector ledge having a smooth radially inward projection edge or an edge having some deviation from a smooth annular curve is contemplated as a part of the present invention.

Although, it is preferred to use stainless steel, it is envisioned that any inert material of rigid form can be used for the splash guard. Plastics, metal alloys, powdered metals, fabrics, textiles and ceramics are all contemplated.

The vessel 10 can also be used for product flow in the opposite direction where outlet 16 functions as a pressurizing gas inlet to form a pressure head on liquid contained in the vessel 10 and force the liquid, in liquid phase, out the diptube 14 for liquid delivery from the container using a pressurizing gas, in contrast to the vapor delivery described above.

The invention claimed is:

1. A process of delivering a chemical precursor vapor from a container comprising; passing a carrier gas through a diptube of the container; entraining liquid chemical precursor from the container into the carrier gas; passing the entrained chemical precursor and carrier gas past an annular, radially inward projecting deflector ledge of a sidewall of the container and at least one baffle disc configured as a shallow downwardly open cone in a narrow annular space between an outermost edge of the baffle disc and an inner surface of the container sidewall.

2. The process of claim 1 wherein the deflector ledge has an innermost edge that is radially inward of the outermost edge of the baffle disc.

3. The process of claim 2 wherein the deflector ledge has a shoulder below the innermost edge of the deflector ledge, which shoulder projects radially inward from the container inner surface of the sidewall, short of the innermost edge of the deflector ledge,that redirects any liquid chemical away from the baffle disc.

4. The process of claim 3 wherein the carrier gas with entrained liquid chemical precursor is delivered from the container in an outlet with an elbow configuration.

5. The process of claim 3 wherein the carrier gas with entrained liquid chemical precursor is delivered from the container in an outlet with a "Tee" configuration.

6. A process of delivering a liquid chemical precursor from a container comprising; introducing a pressurizing gas into an inlet to the container above a liquid level of the liquid chemical precursor in the container, wherein the pressurizing gas passes at least one baffle disc configured as a shallow downwardly open cone in a narrow annular space between the outermost edge of the baffle disc and the inner surface of the container sidewall and an annular, radially inward projecting deflector ledge on the sidewall, proximate the baffle disc.

* * * * *